July 8, 1969 L. E. LANDEBORG ETAL 3,454,176
FORK TRUCK
Filed May 15, 1967 Sheet 1 of 2
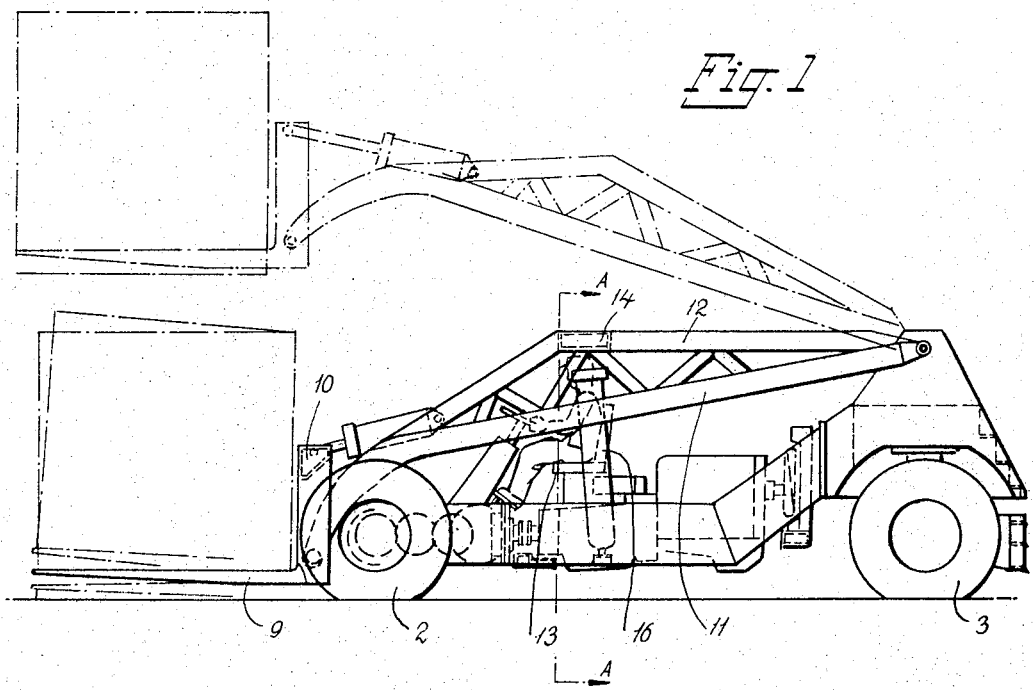
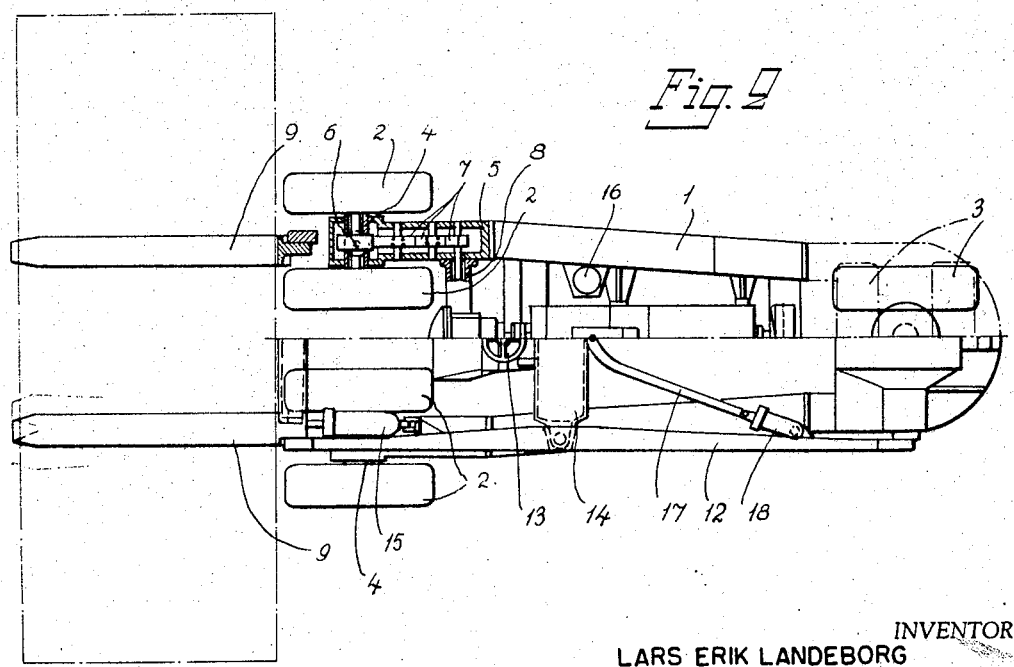
INVENTORS
LARS ERIK LANDEBORG
SUNE TORSTEN HENRIKSSON
RAGNAR LUDVIG MUOTKA
BY Whittemore, Hulbert
& Belknap ATTORNEYS July 8, 1969  L. E. LANDEBORG ETAL  3,454,176
FORK TRUCK
Filed May 15, 1967  Sheet 2 of 2
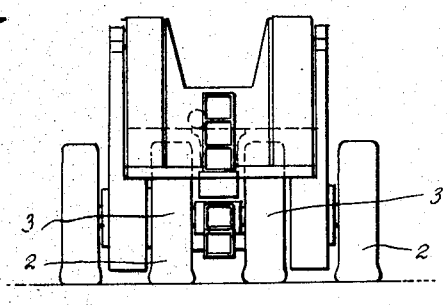
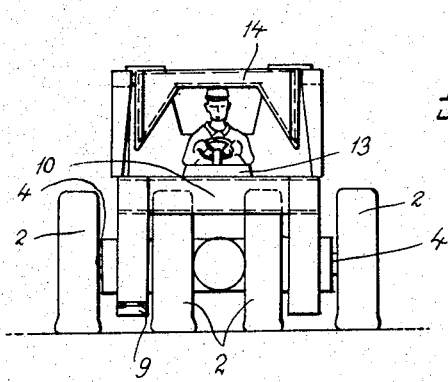
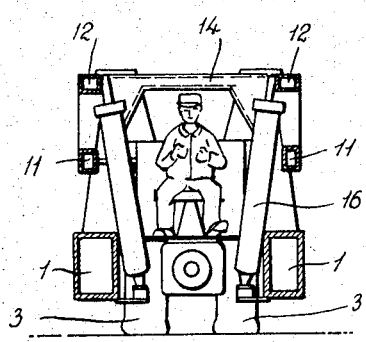
INVENTORS
LARS ERIK LANDEBORG
SUNE TORSTEN HENRIKSSON
RAGNAR LUDVIG MUOTKA
BY Whittemore, Hulbert
 & Belknap  ATTORNEYS United States Patent Office 3,454,176
Patented July 8, 1969

3,454,176
FORK TRUCK
Lars Erik Landeborg, Exercisgatan 2, Malmo, Sweden; and Sune Torsten Henriksson, Kvartsvagen 6, and Ragnar Ludvig Muotka, Kyrkogatan 46, both of Kiruna, Sweden
Filed May 15, 1967, Ser. No. 638,306
Claims priority, application Sweden, May 18, 1966, 6,882/66
Int. Cl. B66f 9/00; B62d 61/06
U.S. Cl. 214—768                                 7 Claims

ABSTRACT OF THE DISCLOSURE

A fork truck including two spaced apart pairs of spaced apart wheels at one end of the truck separately rotatably mounted at the sides thereof, a pair of link arms pivotally mounted at the other end of the truck each extending between one of the spaced apart pairs of wheels at one side of the truck, spaced apart L-shaped fork members pivoted at their apex to the other end of the link arms and rigidly secured together transversely of the truck piston and cylinder structure extending between the forks and the link arms for tilting the forks forward and backward is disclosed. A lifting cylinder connected between the truck and each of the link arms for raising and lowering the link arms and valve means operable between the lifting cylinders to permit adjustment of the height level of the link arms and consequently of the lifting fork arms in relation to each other are also disclosed, along with piston and cylinder structure connected diagonally between the sides of the fork truck and a central transverse connection between the link arms for providing a limited lateral movement of the lifting fork relative to the truck.

---

The present invention relates to a fork truck which is meant to be used in the first place for handling containers and similar transport means but also in other fields where heavy-duty fork trucks are utilized, and is also particularly well suited for use in loading and unloading ships.

The increasing use of containers, semitrailers and trailers in standard sizes has made it possible to organize well-planned chains of transportation in which for instance ships and roll-on/roll-off train sets are important components. In order to achieve full use in such chains of transportation it is, however, also necessary to use other means which are designed with special attention paid to the demands for strength, operational reliability and mobility which have to be placed in order that there will be no bottlenecks in the chain of transportation. A large and important problem has arisen particularly in connection with the loading and unloading of ships as a result of the increasing use of containers having a weight of up to 20 tons. When handling containers of relatively low weight it is possible to use conventional fork trucks also in ships, but when handling containers weighing as much as 20 tons, problems arise because a conventional fork truck will exert a too concentrated stress on the ship's deck. In addition, the fork telescope means in a conventional truck is too high and besides obstructs the view, which makes it difficult to operate the truck in crowded spaces.

The purpose of the invention is consequently to provide a fork truck for handling containers and the like of a weight not exceeding 20 tons, in which the weight is distributed over the floor in such a way that the truck may be used on a ship's deck without exposing the latter to too powerful stresses and which has a small overall height in relation to its capacity and is also of compact construction in other respects.

The fork truck according to the invention has wheels mounted at its ends and a lifting fork provided at one end, and is characterized in that the lifting fork is carried by two link arms disposed at the end of the truck which is opposite to the fork and extend longitudinally of the truck, that the wheels at the fork end of the truck are mounted in two pairs disposed each on one axle and that their distance from each other, the distance between the wheels in each pair of wheels, and the distance between and the position of the link arms are adjusted in such a way in relation to each other that when the lifting fork is in its lowered position the link arms extend between the wheels in each of the two pairs of wheels immediately above the wheel axle, whereby the smallest possible distance is obtained between the point of gravity of the container and the centre of the wheel axles.

Because the truck is designed in this way it is possible also to obtain a suitable distance between the wheels in the lateral sense, which distance has to be adjusted in relation to the frame division of the ship, and a suitable distance between the lifting fork arms which must be adjusted in relation to the fork pockets in the container without giving the truck such dimensions as to make it difficult to handle. In a fork truck according to the invention the weight is well distributed over the floor, and the robust and low-silhouetted fork construction of the truck gives a high degree of operational reliability and a better forward view than a fork telescope, and permits use of the truck on board ships having a deck level of down to 2.6 meters.

Further particulars and advantages of the invention will be apparent from the accompanying drawings showing a fork truck according to the invention which will be described in the following with reference to the accompanying drawings, in which FIG. 1 is a side view of the truck, FIG. 2 is a plan view of the truck with certain parts removed for the purpose of showing the undercarriage of the truck, FIG. 3 is a rear view of the truck, FIG. 4 is a front view of the truck, and FIG. 5 is a section on line A—A in FIG. 1.

The shown fork truck intended for heavy loads is built on frame girders 1 converging towards the rear end of the truck in order to give an essentially triangular shape to the undercarriage. The truck has totally six wheels 2 and 3, which are arranged in pairs at the corners of the triangular undercarriage 1. In order that a load of the size transmitted to the floor from the two forward wheel pairs 2 when a heavy load is lifted by the fork truck may be transmitted to a ship's deck without exposing it to too much stress in a concentrated area, the two forward pairs of wheels 2 are disposed at a considerable distance from each other. Besides the distances between the wheel pairs 2 must also be determined in relation to the frame division of ships on whose decks the truck is meant to operate. In order that all four front wheels 2 may be arranged to drive and yet be disposed at a great distance from each other with the same division, without entailing unnormal rubber wear and operational difficulties, these two pairs of wheels 2 are disposed each on one axle 4. The axles 4 of the front wheel pairs are each connected via one gear box 5 with differential gears 6 and cylindrical gear wheels 7 to a truck shaft driven by the truck motor and being of the standard type having a differential gear 8.

At its front end the truck has a lifting fork consisting of two L-shaped fork arms 9 and a transverse girder 10 rigidly uniting the arms 9. The fork arms 9 are articulated each to one link arm 11 at the angle apex. The two link arms 11 are pivotally connected to the rear end of the truck at its end opposite to the lifting fork. The link arms 11 are reinforced by means of frame structures 12 and are pivotally united above the driver's seat 13 by means of a transverse girder 14 which is journalled in the arms 11 and 12 in such a way that these are laterally movable as a parallelogram in relation to each other to a limited extent.

The properties which are specially characteristic of the truck according to the invention, viz. small overall height, over the floor, and a good view from the driver's seat 13 have been achieved as a result of the relative positions good distribution of the weight of the truck and the load of the four forward wheels 2 and the link arms 11 carrying the lifting fork arms 9. As is shown in the drawings, the distance between the two front wheel pairs, the distance between the wheels 2 in each of these wheel pairs, and the distance between and the position of the link arms 11 are such that when the link arms and consequently also the lifting fork are in a lowered position, they will extend through the interspace between the wheels 2 immediately adjacent the gear box 5 of each of the two wheel pairs. In order that the lifting fork arms 9 may be lowered sufficiently far without the link arms being obstructed by the gear boxes 5 of the two front wheel pairs, the link arms 11 are swung down at that end which is connected with the lower part of the vertical portion of the respective fork arms 9.

Two piston and cylinder units 15 extend between each one end of the transverse girder 10 of the lifting fork and each one of the link arms 11 in order to tilt the lifting fork forward and backward.

Two piston and cylinder units 16 are connected between the frame girder 1 and the transverse girder 14 each at one side of the truck in order to raise and lower the link arms 11 and consequently the lifting fork. A differential valve is connected between the two piston and cylinder units 16 in order to permit them to be operated in unison. By adjusting the zero position of the said differential valve in such a way that the piston and cylinder units 16 lift the link arms 11 and consequently the lifting fork arms 9 to different levels, it is also possible to tilt the lifting fork laterally.

Lateral displacement of the lifting fork arms 9 is carried out with the aid of two bars 17 which are elongations of piston and cylinder units 18 attached each to one side of the truck at the rear end thereof and are connected with a common point at the middle of the transverse girder 14 provided between the link arms in order to displace the link arms 11 and consequently the lifting fork arms 9 as a parallelogram in a lateral sense by means of the piston and cylinder units 18.

All means required for operating the truck, such as gear box, hydraulic pump and engine, form a unit which is disposed in the undercarriage of the truck.

What is claimed is:
1. A fork truck including a pair of spaced apart wheels mounted on separate axles at each side of one end of the fork truck in spaced apart relation, a pair of link arms extending longitudinally of the truck each having one end pivoted thereto at the other end thereof, the other end of the link arms extending between the spaced apart wheels of the pair of wheels at the opposite sides of the truck, means for pivoting the link arms vertically about the other end of the fork truck and fork means secured to the other end of the link arms.

2. Structure as set forth in claim 1 wherein the fork means includes at least two L-shaped fork arms having angle apexes pivotally secured to the other ends of the link arms at the angle apexes of the fork arms, means rigidly securing the fork arms together transversely of the truck and means operably associated with the fork arms for tilting the fork arms forward and backward.

3. Structure as set forth in claim 2 wherein the means for tilting the fork arms forward and backward includes piston and cylinder structure connected between the fork arms and link arms.

4. Structure as set forth in claim 1 wherein the means for pivoting the link arms vertically includes a lifting cylinder connected between each side of the fork truck and a separate one of the link arms at each side thereof centrally.

5. Structure as set forth in claim 4 and further including an adjustable differential valve connected between the lifting cylinders for varying the height level of the link arms and subsequently of the lifting fork arms in relation to each other.

6. Structure as set forth in claim 1 and further including means operable between the truck at the opposite sides thereof and the link arms for providing limited pivoting of the link arms in a horizontal plane.

7. Structure as set forth in claim 6 wherein the means for providing limited pivoting of the link arms in a horizontal plane comprises a transverse connection between the link arms centrally thereof, piston and cylinder structure connected to the opposite sides of the truck at one end and connected to the transverse connection between the link arms centrally thereof at the other end.

References Cited
UNITED STATES PATENTS
2,990,072   6/1961   Mindrum _____ 214—141 X HUGO O. SCHULZ, *Primary Examiner*

U.S. Cl. X.R.
180—27; 214—778